No. 695,792. Patented Mar. 18, 1902.
Z. L. CHADBOURNE.
HAMMOCK LOOM.
(Application filed May 7, 1901.)
(No Model.) 11 Sheets—Sheet 1.
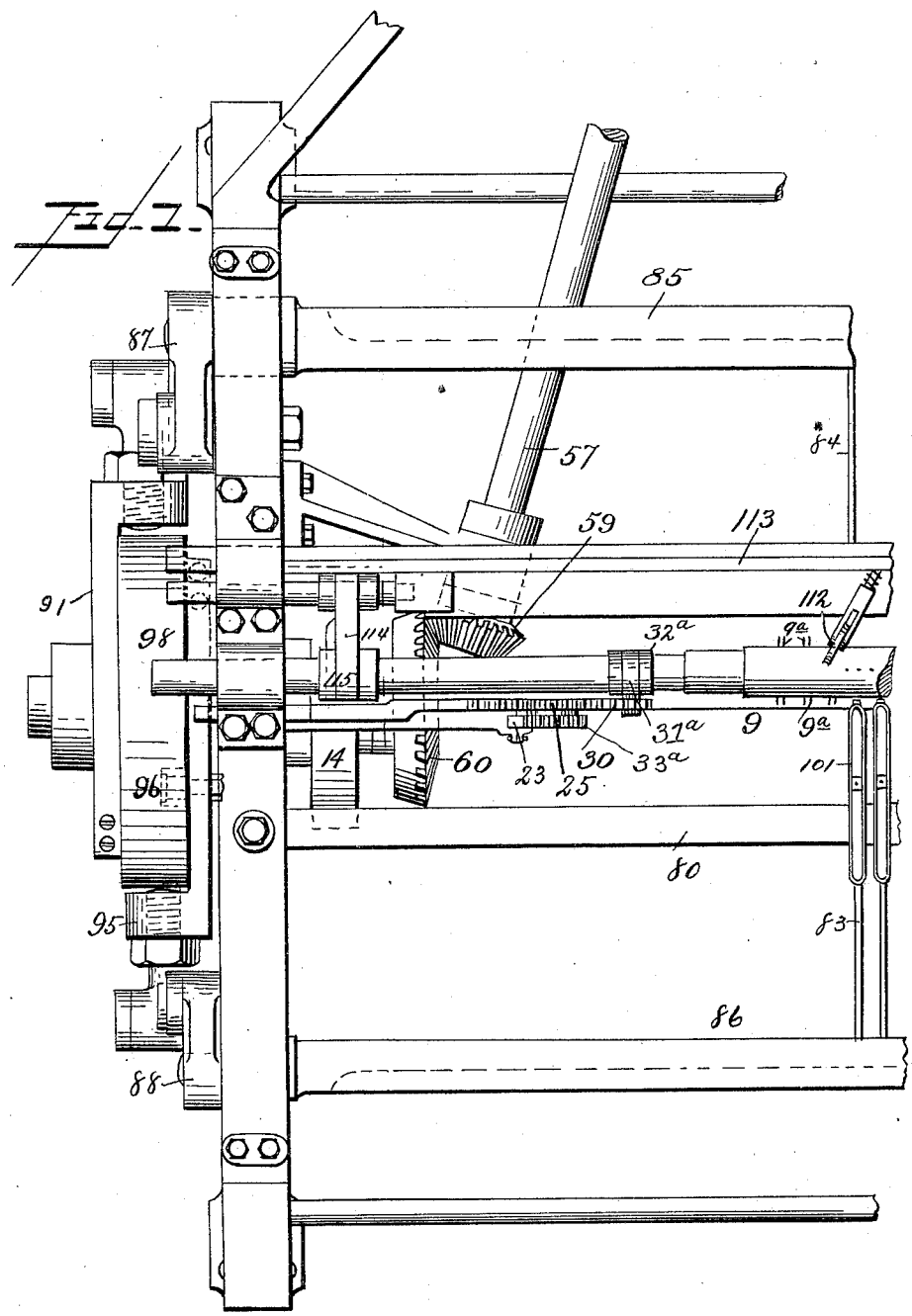

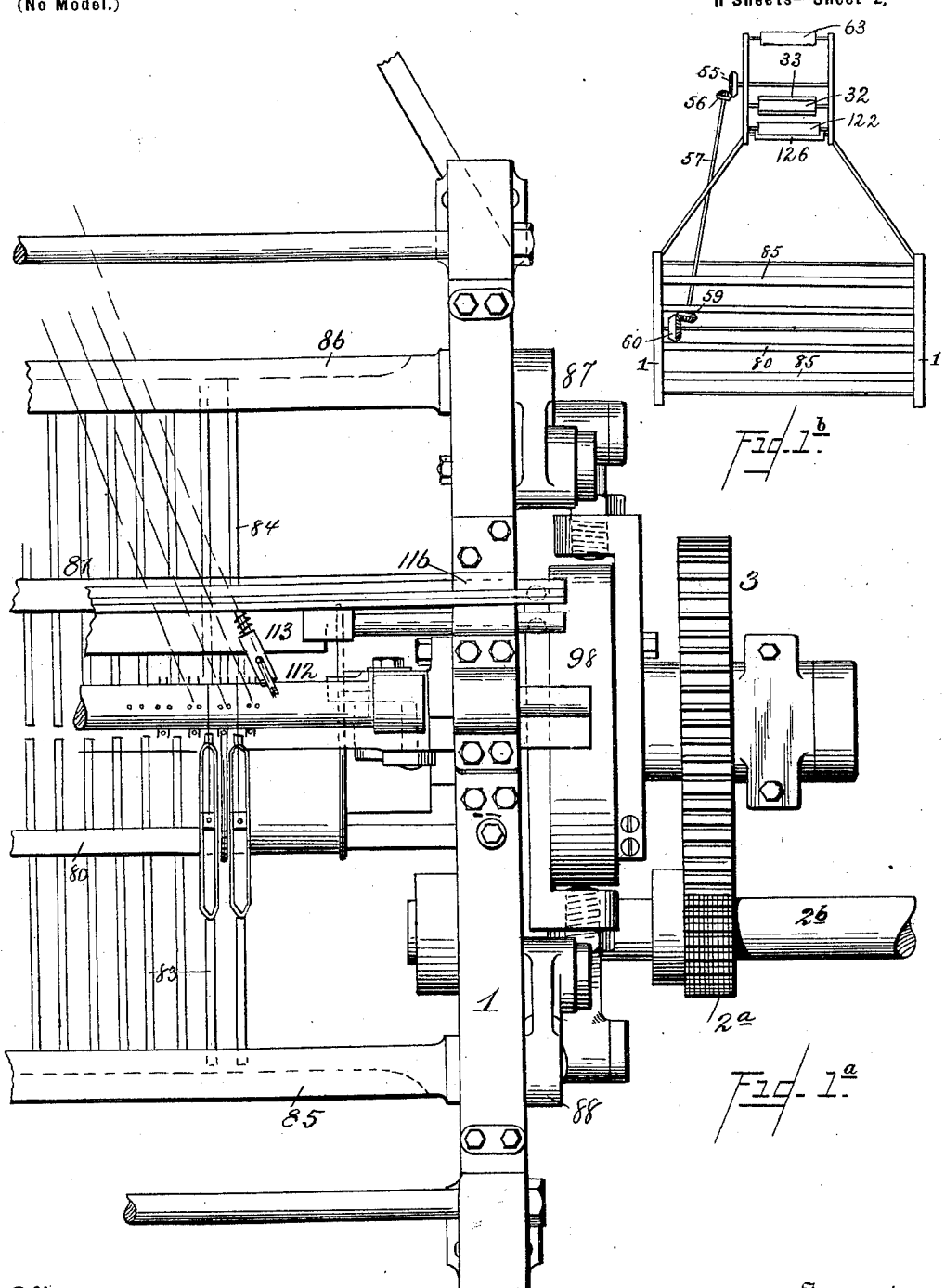

No. 695,792. Patented Mar. 18, 1902.
Z. L. CHADBOURNE.
HAMMOCK LOOM.
(Application filed May 7, 1901.)
(No Model.) 11 Sheets—Sheet 3.
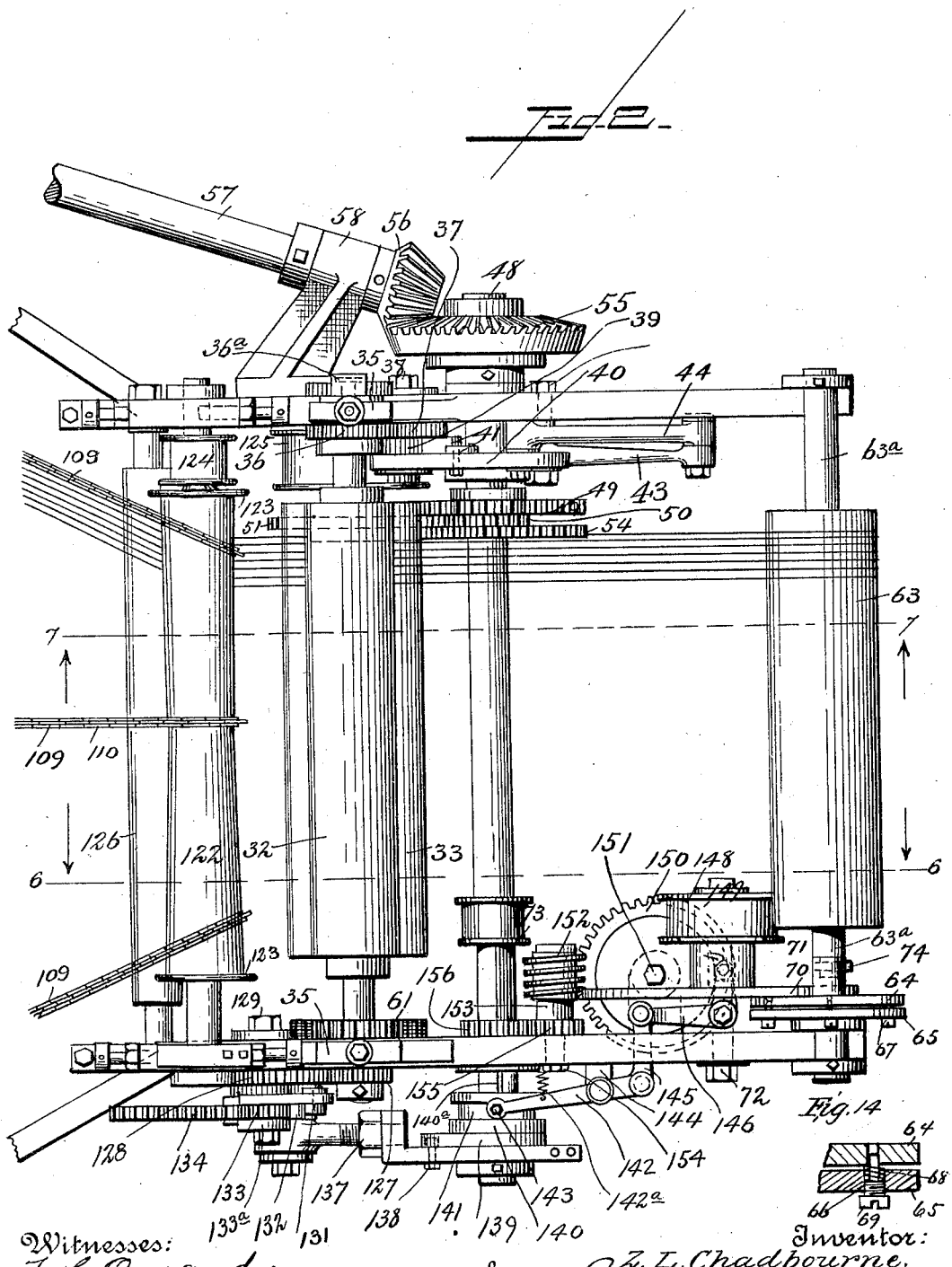

No. 695,792. Patented Mar. 18, 1902.
Z. L. CHADBOURNE.
HAMMOCK LOOM.
(Application filed May 7, 1901.)
(No Model.) 11 Sheets—Sheet 4.
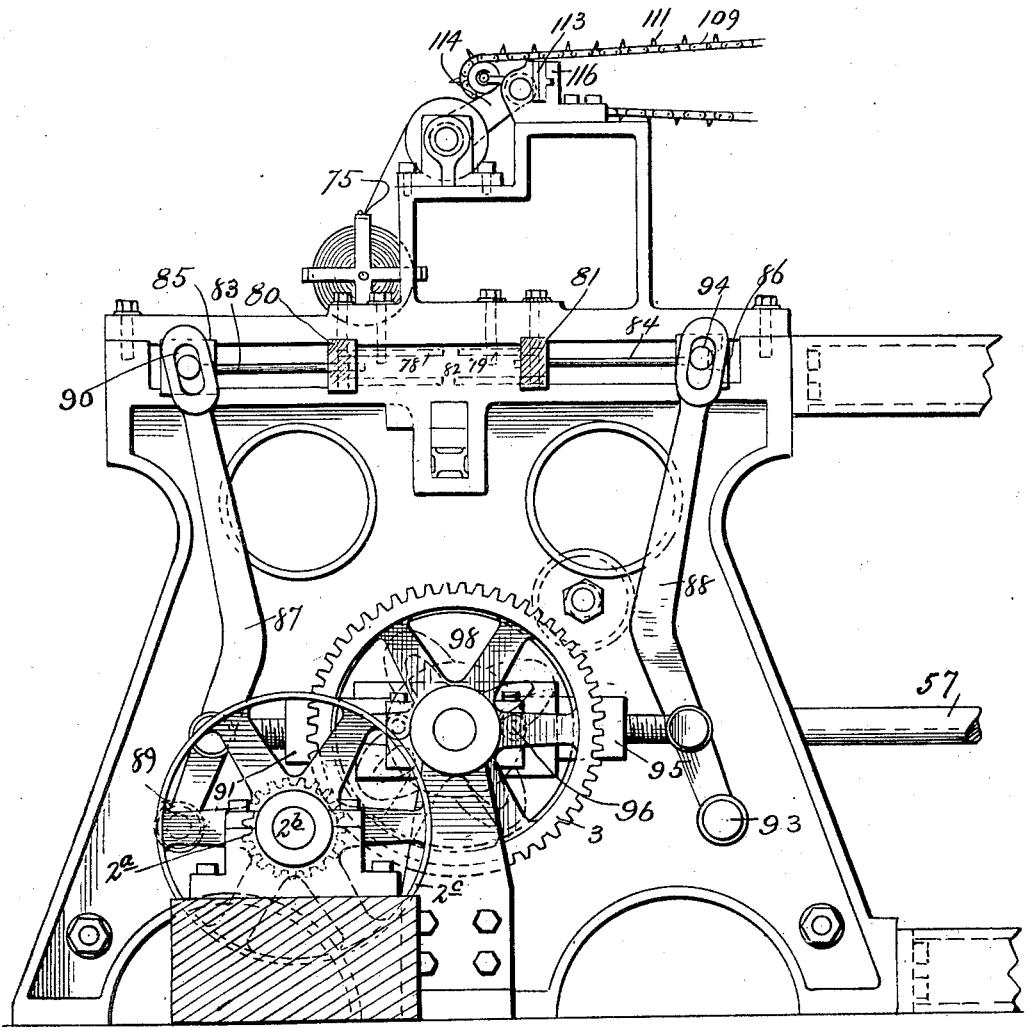
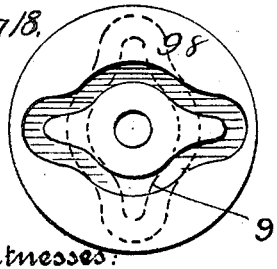
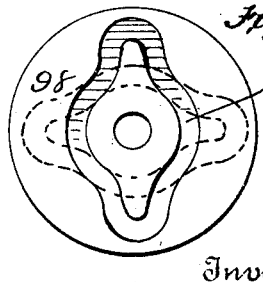
Fig. 18. Fig. 19.
Witnesses: Inventor:
F. L. Ourand. Z. L. Chadbourne,
Frank G. Radelfinger. by Louis Bagger & Co.,
Attorneys.

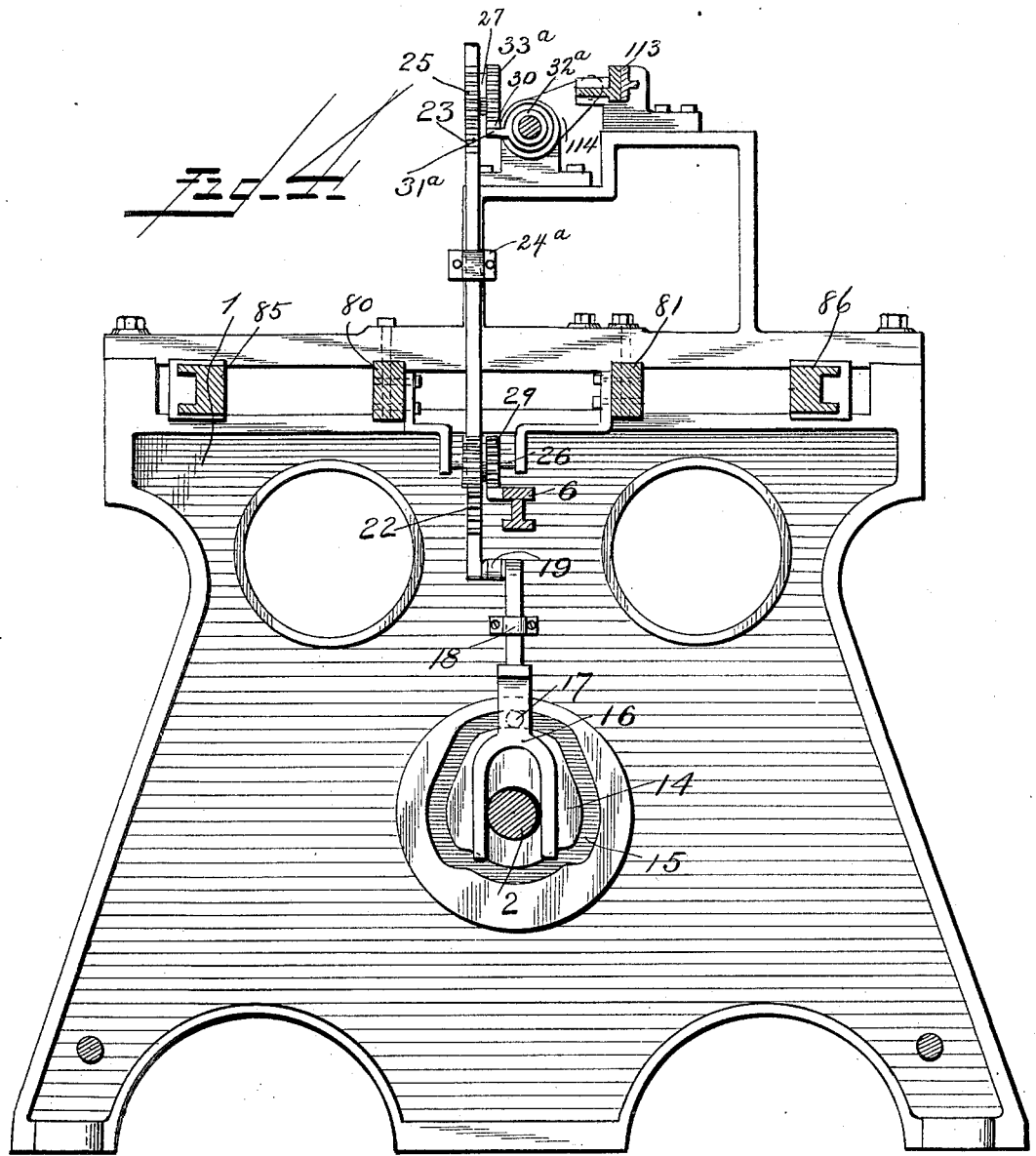

No. 695,792. Patented Mar. 18, 1902.
Z. L. CHADBOURNE.
HAMMOCK LOOM.
(Application filed May 7, 1901.)
(No Model.) 11 Sheets—Sheet 6.

Witnesses:
F. L. Durand.
Frank G. Radelfinger.

Inventor.
Z. L. Chadbourne,
by Louis Bagger & Co.,
Attorneys.

No. 695,792.  
Patented Mar. 18, 1902.
Z. L. CHADBOURNE.
HAMMOCK LOOM.
(Application filed May 7, 1901.)
(No Model.)  
11 Sheets—Sheet 7.
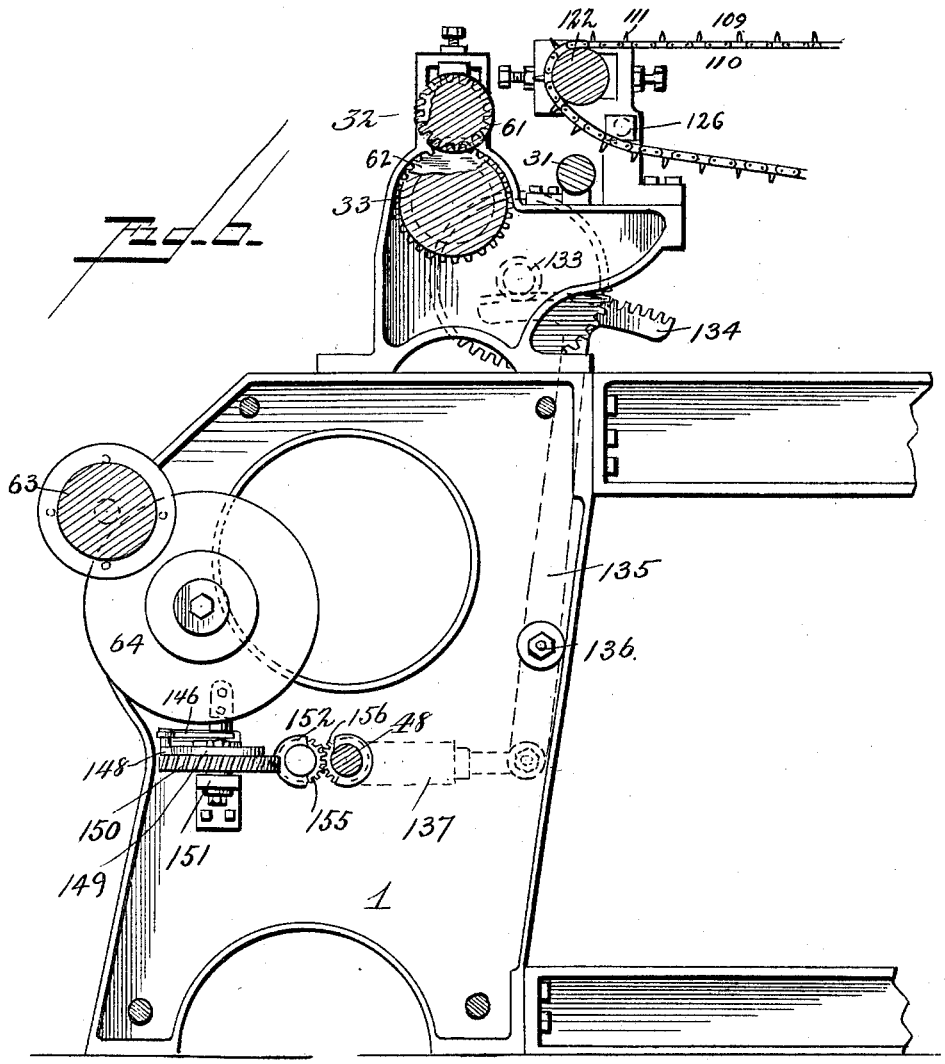
Witnesses:  
Franck L. Ormand.  
Frank G. Radelfinger.
Inventor:  
Z. L. Chadbourne,  
by Louis Bagger & Co.,  
Attorneys

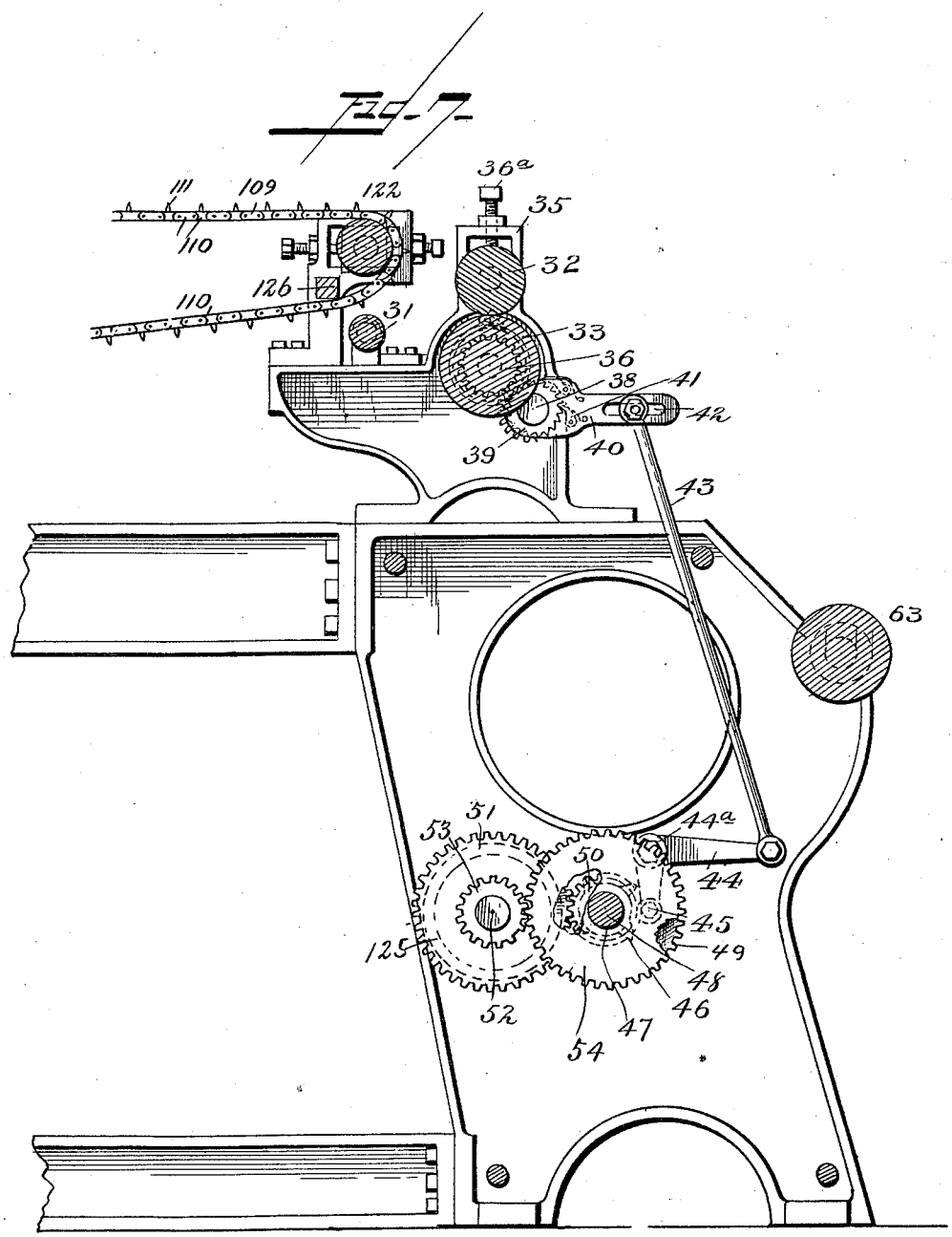

No. 695,792. Patented Mar. 18, 1902.
Z. L. CHADBOURNE.
HAMMOCK LOOM.
(Application filed May 7, 1901.)
(No Model.) 11 Sheets—Sheet 9.
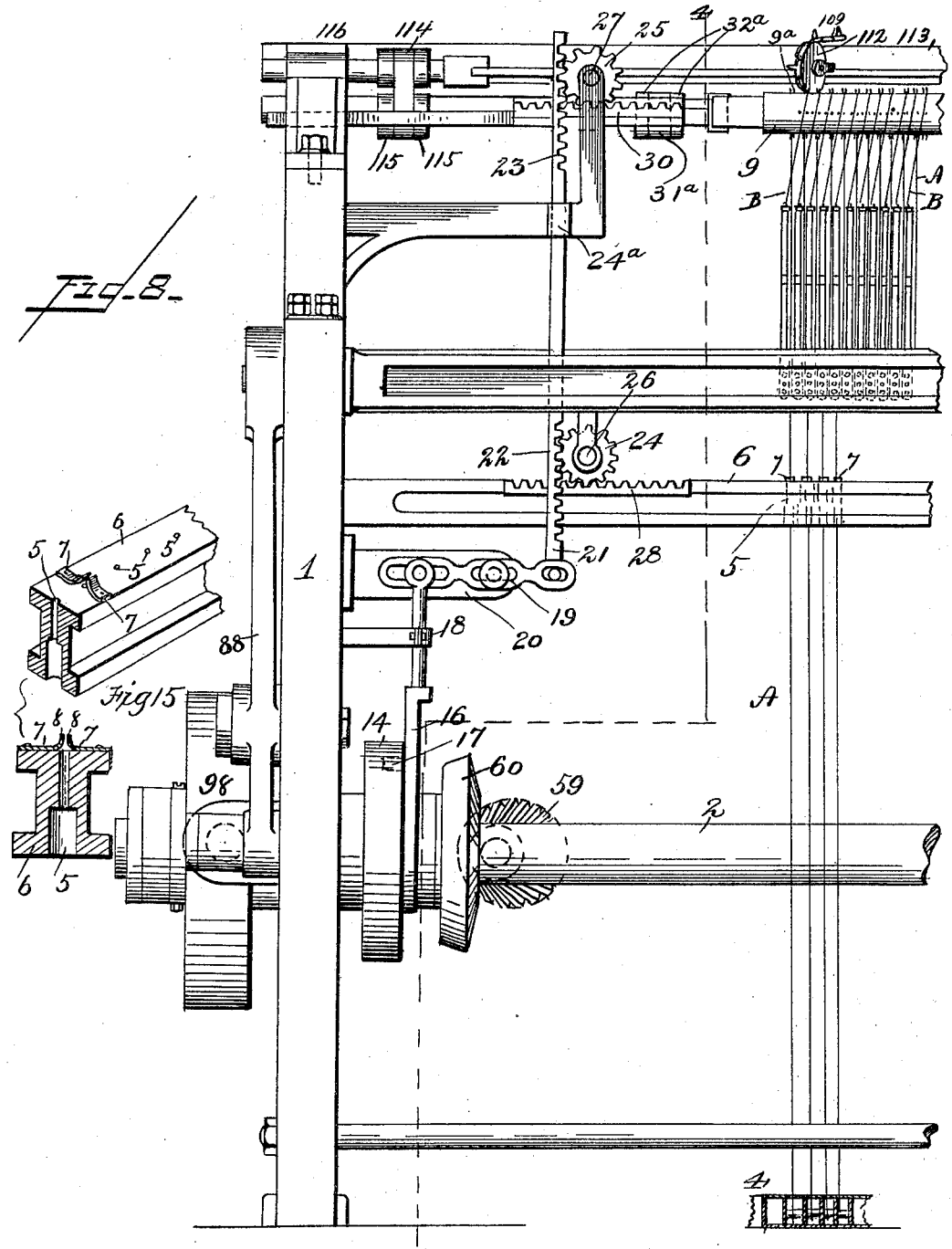

No. 695,792. Patented Mar. 18, 1902.
Z. L. CHADBOURNE.
HAMMOCK LOOM.
(Application filed May 7, 1901.)
(No Model.) 11 Sheets—Sheet 10.

Fig. 8.ª

Witnesses: Inventor:
Franck L. Ourand Z. L. Chadbourne,
Frank G. Radelfinger. by Louis Bagger & Co.
Attorneys.

No. 695,792. Patented Mar. 18, 1902.
Z. L. CHADBOURNE.
HAMMOCK LOOM.
(Application filed May 7, 1901.)
(No Model.) 11 Sheets—Sheet 11.
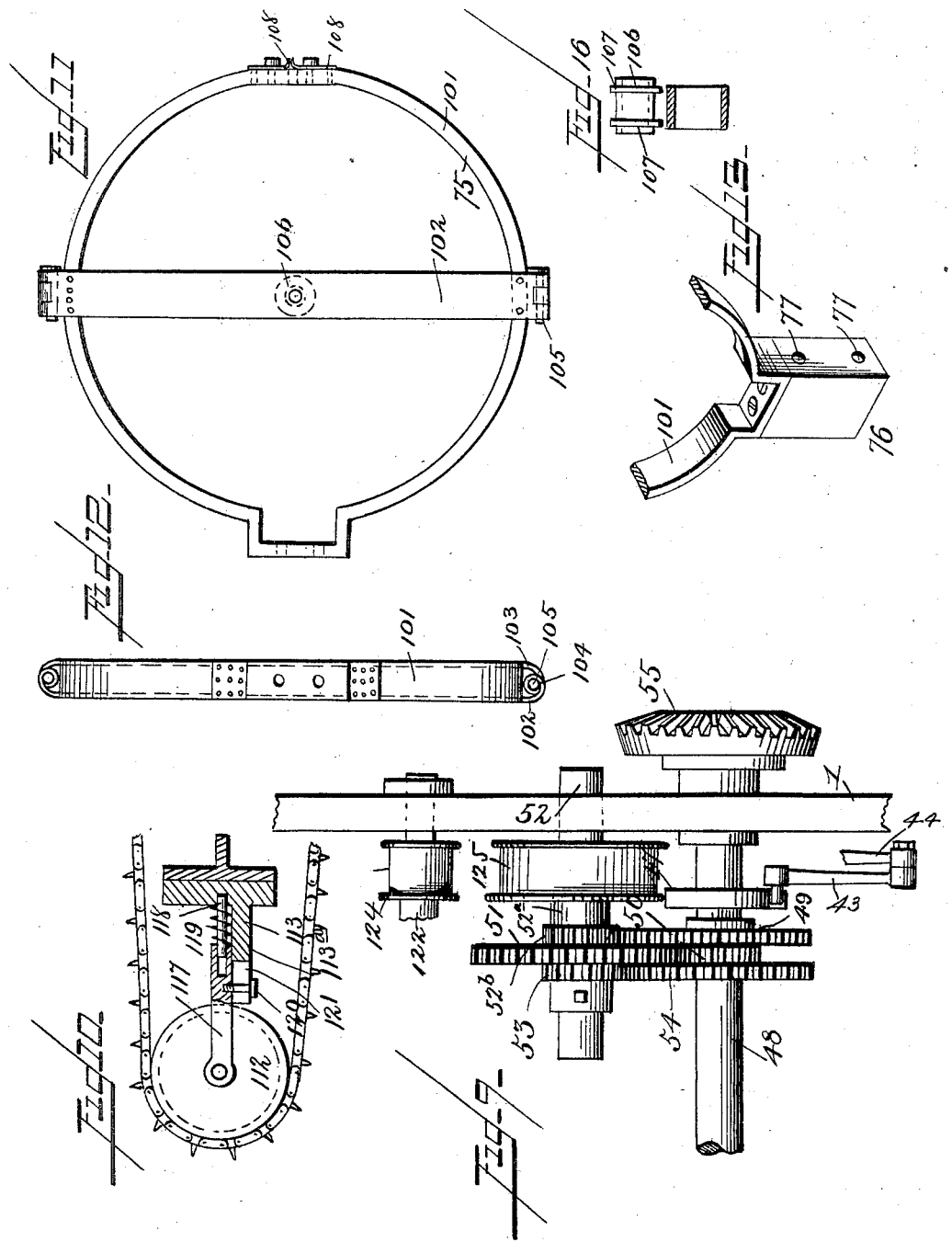

UNITED STATES PATENT OFFICE.

ZEBULON L. CHADBOURNE, OF NEW BRIGHTON, NEW YORK.

HAMMOCK-LOOM.

SPECIFICATION forming part of Letters Patent No. 695,792, dated March 18, 1902.

Application filed May 7, 1901. Serial No. 59,118. (No model.)

*To all whom it may concern:*

Be it known that I, ZEBULON L. CHADBOURNE, a citizen of the United States, residing at New Brighton, in the county of Richmond and State of New York, have invented new and useful Improvements in Hammock-Looms, of which the following is a specification.

My invention relates to hammock-looms; and it consists of improvements on my machine covered by allowed application, Serial No. 66,792, which is a machine for weaving the Mexican-mesh hammock.

The objects of the same are, first, to provide improved means for intermittenly moving the pin-roll and tension-bar in unison; secondly, means for beating the meshes back to make the fabric more closely woven; thirdly, an improved feed mechanism; fourthly, an improved drum mechanism; fifthly, an improved shuttle. These objects are accomplished by the novel construction described in this specification and claimed and illustrated in the accompanying drawings, forming a part thereof, in which—

Figure 5:
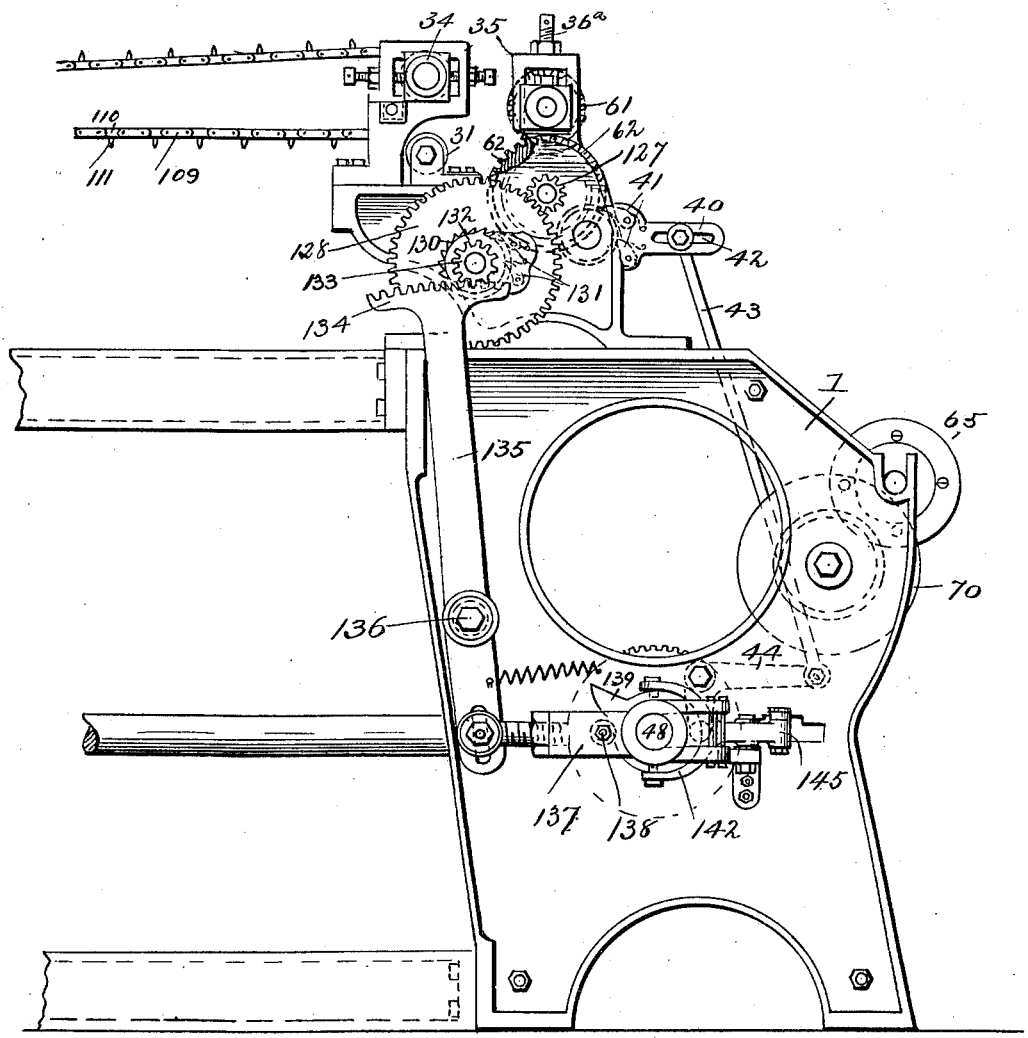
Figure 17:
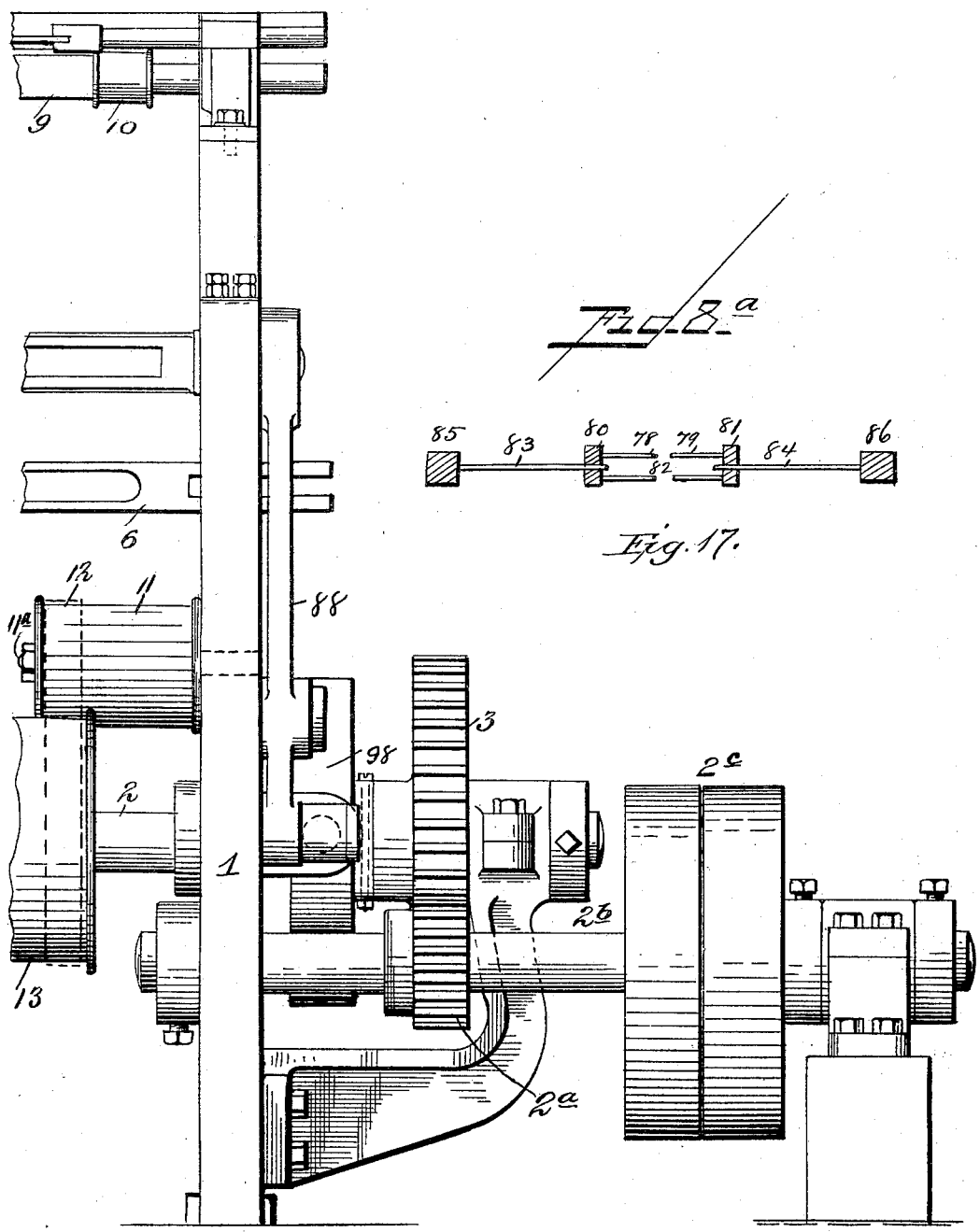

Figure 1, Sheet 1, is a plan view of the left-hand side of the forward end of the machine. Fig. 1$^a$, Sheet 2, is a plan view of the right-hand side of the forward end of the machine. Fig. 1$^b$ is a diagrammatic plan of the frame of the machine. Fig. 2, Sheet 3, is a plan view of the rear end of the machine. Fig. 3, Sheet 4, is a side elevation of the right side of the front end of the machine. Fig. 4, Sheet 5, is a vertical section on the line 4 4, Fig. 8, looking toward the left. Fig. 5, Sheet 6, is a side elevation of the right side of the rear end of the machine. Fig. 6, Sheet 7, is a vertical section on the line 6 6, Fig. 2, looking toward the right. Fig. 7, Sheet 8, is a vertical section on the line 7 7, Fig. 2, looking toward the left. Fig. 8, Sheet 9, is a front elevation of the left side of the machine. Fig. 8$^a$, Sheet 10, is a front elevation of the right side of the machine. Fig. 9, Sheet 11, is a detail of the train of gearing for operating the chain-roller. Fig. 10, Sheet 11, is a detail side elevation of one of the sheaves and a fragment of the sheave-rail. Fig. 11, Sheet 11, is a detail side elevation of the casing of one of the shuttles. Fig. 12, Sheet 11, is an elevation of the edge of the same. Fig. 13, Sheet 11, is a detail perspective of a shuttle-block and a fragment of the ring. Fig. 14, Sheet 3, is a fragmentary detail of the friction-disk 64, the spring, and adjusting-screw. Fig. 15, Sheet 9, is a transverse section and perspective of a fragment of the tension-board. Fig. 16, Sheet 11, is a detail of the bobbin-spindle. Fig. 17, Sheet 10, is a detail of the pin and pusher-rails. Fig. 18, Sheet 4, is a side elevation of the right face of the cam 98. Fig. 19, Sheet 4, is a side elevation of the left face of the same.

Like numerals of reference denote like parts in the different views of the drawings.

The numeral 1 designates the two forward frames of my machine which support the main shaft 2, provided with a gear 3, meshing with a gear 2$^a$, keyed on a shaft 2$^b$, carrying a tight and loose pulley 2$^c$, connected to some source of power. The warp-threads A for my machine pass from reels contained in boxes 4 through perforations 5 in a tension-bar 6. This bar 6 extends transversely the machine and is mounted to slide endwise, as in my former machine. A tension device is provided, Fig. 8, for each of the warp-threads A, which tension consists of two spring-tongues 7, having curved ends notched at 8 and located one on each side of the perforation 5. The warp-thread passes from the tension-bar 6 across an interval to a pin-roller 9, which is mounted to revolve and to slide longitudinally. To drive it, a pulley 10 is keyed thereon, which pulley is connected by a belt to a pulley 11, mounted on a stub-shaft 11$^a$, which pulley 11 is connected by a belt 12 to a pulley 13, keyed on the main shaft 2. By this arrangement the pin-roller is constantly revolved. As in my former case, the pin-roller 9 carries a series of pins 9$^a$, which serve as guides for the warp-threads. It is necessary to move the tension-bar and pin-roller intermittently, longitudinally, and in unison. For this purpose I key an internal cam 14 (see Figs. 4 and 8) on the main shaft 2. One face of the cam 14 is cut by a heart-shaped groove 15, symmetrical with respect to a diameter of the cam. A fork 16 straddles the main shaft 2 and carries a pin 17, which engages the groove 15. A guide 18, bolted to the frame 1, holds the fork 16 in line. A lever 19 is fulcrumed on an arm 20, bolted to the frame 1, is slotted at its ends, and is pivoted to the upper end of the fork 16. The lever 19 is pivoted at its opposite end to an upwardly-extending bar 21, bearing racks 22 and 23 and mounted to slide in guides 24ª. The racks 22 and 23 are located to mesh with gears 24 and 25, respectively mounted on shafts 26 and 27, journaled in arms supported by the frame of the machine. A rack 28 is rigidly attached to the tension-bar 6 and meshes with a gear 29, keyed on the shaft 26. A rack 30 is mounted to slide in the frame of the machine and is connected to the pin-roller by an arm 31ª, loosely fitting between two collars 32ª, shrunk on the spindle of the roller. The rack 30 meshes with a gear 33ª, keyed on the shaft 27. By the combination of the grooved cam 14, the fork 15, the lever 19, and the gears and racks the tension-bar 6 and pin-roller 9 are moved back and forth a distance of four threads of warp each way. The motion is intermittent, first moving two threads in one direction, then two threads more in the same direction, then two threads back, and finally back to the initial point, having completed the cycle in four equal distinct movements. The concentric portions of the groove 15 correspond to the intervals of time when the shuttles are being pushed through the plane of the warp, as will appear, and the four sharp turns correspond to the four movements of the warp-threads. This cycle is completed at every revolution of the main shaft.

From the pin-roller 9 the warp A converges and spans a large interval and next rests on a sag-roller 31, which extends across the machine and is journaled in the rear frames thereof. The sag-roller 31 holds the mesh up within reach of the carrier-chains, to be hereinafter described. From the sag-roller 31 the threads pass between two smooth feed-rollers 32 and 34, which will be respectively referred to as the "upper" and the "lower" feed-rollers. The lower roller 33 is journaled in the frame and held rigid against all displacement but that of rotation; but the upper roller 32 is journaled in boxes 34, which are mounted to slide in frames 35. Set-screws 36ª, fitting apertures in the frames 35, bear on the boxes 34, and thereby regulate the pressure between the two rollers 32 and 33. The feed-rollers are driven intermittently and make a portion of a turn at each movement of the tension-bar, hereinbefore described. In order to so drive these feed-rollers, the lower roller 33 has a gear 36, keyed on the outer end. This gear 36 meshes with a smaller gear 37, supported on a stud 38, jutting out from the left side of the frame 1, which gear 37 is rigidly connected to a ratchet 39. An arm 40 is pivoted on the stud 38 and carries two pawls 41, which engage the ratchet 39. Two pawls 41 are used to give greater strength to the device. The outer end of the arm 40 is slotted at 42 and adjustably connected to a connecting-rod 43, which extends down and is pivoted at its lower end to the long arm of a bell-crank lever 44, fulcrumed on a pin 44ª, seated in the frame. The short arm of lever 44 is provided with a roller 45, which is located to engage the projections 46 of a four-armed cam 47 on the power-shaft 48, and thereby intermittently actuate the connecting-rod 43 and the lower feed-roller 33. The power-shaft 48 is driven by means of a bevel-gear 55, keyed on the outer end thereof, which gear meshes with a beveled gear 56, keyed on a shaft 57. (See Fig. 2, Sheet 3.) The shaft 57 is supported at its rear end by a bracket-arm 58, bolted to the frame. The forward end of the shaft 57 carries a bevel-gear 59, (see Figs. 1 and 8,) which meshes with a bevel-gear 60, keyed on the main driving-shaft 2 of the machine. By the mechanism just described the motion of the shaft 2 is communicated to the shaft 48, from which it is transferred to the cam 47, which in turn intermittently operates the lower feed-roller 33.

In order to drive the upper roller 32, a gear 61 is keyed on its right spindle, (see Fig. 2, Sheet 3,) which gear meshes with a gear 62 of larger size keyed on the corresponding spindle of the lower roller 33. By this connection the two rollers 32 and 33 are always run at the same speed and the fabric intermittently fed along.

From the feed-rollers the fabric passes down to a drum 63, which is located in the extreme rear of the machine (see Figs. 7 and 2) and is supported on spindles 63ª, journaled in the frame of the machine. For driving the drum 63 a friction-motor is provided which always keeps the woven fabric taut. To accomplish this, a friction-disk 64 is slidingly mounted on the right spindle 63ª, (see Fig. 2, Sheet 3,) adjacent and parallel to a disk 65, keyed on the spindle of the drum 63. The disk 65 has an aperture 66 in each quadrant, within which apertures are fitted pins 67, surrounded by coiled springs 68. The springs 68 bear against the outer face of the disk 64. Tension-screws 69, integral with the pins, serve to regulate the pressure of the springs on the disk 64. The inner face of the friction-disk 64 is thus held in contact with a large friction-disk 70, carried by a pulley 71, mounted to revolve on a stud 72, supported on the frame. The pulley 71 is located to be driven by a belt connecting it to a pulley 73, keyed on the shaft 48. By this arrangement of the two friction-disks 64 and 70 and the pulleys for driving the disk 70 the pull exerted by the drum 63 is maintained constant and the fabric kept taut. The amount of this pull can be varied by means of the screws 69, which regulate the pressure between the two friction-disks 64 and 70.

It should be noted that the right spindle 63ª is made in sections secured together by a pin 74. This construction enables the drum 63 to be removed when full after removing the pin 74 and a new one substituted. The difference in diameter of the full and empty drums will be automatically compensated for by the friction-motor above described.

The front part of the machine will now be taken up and the mechanism for handling the weft described in detail.

The weft-threads B are placed on the pin-roller 9 intermediate the warp-threads and are held by the pins 9ª thereon, heretofore described. Every alternate space on the roller is occupied by a weft-thread. The supply of weft-thread is carried by a series of shuttles 75, mounted to be intermittently reciprocated to pass them through the plane of the warp A. To accomplish this, each of the shuttles 75 (see Figs. 11, 12, and 13) is provided with a block 76, having two apertures 77 therein. These blocks 76 are slidingly mounted on two series of pins 78 and 79, which are mounted in rails 80 and 81, respectively, extending transversely the machine and rigidly secured. The heads of the pins are slightly rounded and a small space 82 intervenes between the heads of the two series to accommodate the warp-threads and permit them to be shifted bodily transversely, as before described. The interval 82 is of such width that the blocks 76 easily span it, and can thus pass from one series to the other. To actuate the shuttles and drive them from one side of the warp to the other, pusher-rods 83 and 84, carried by slidingly-mounted rails 85 and 86, are located intermediate the pins 78 and 79 and pass through perforations 87 in the rails 85 and 86. The pusher-rails 85 and 86 are mounted in guides and operated by means of a system of four levers, two of which are each designated by the numerals 87 and the remaining two by the numerals 88. One of each kind is placed on each side of the machine. As the two sides are identical, but the right will be described in detail and the same numerals of reference will be placed on the left. The lever 87 (see Fig. 3, page 4) is fulcrumed at its lower end on a stud 89 and slotted at its upper end at 90, which slot engages the reduced rounded end of the rail 85. A fork 91 is pivoted to the lever 87 just above the fulcrum, which fork straddles the shaft 2. The lever 88 is fulcrumed at its lower end on a stud 93, is slotted at its upper end at 94, and is pivotally connected to a fork 95, which straddles the shaft 2. The slot 94 engages the reduced end of the rail 86. The forks 91 and 95 are located opposite each other and bear rollers 96, which engage symmetrical grooves 97 at right angles to each other and in opposite faces of an internal cam 98, keyed on the shaft 2. Another cam 98 is keyed on the opposite end of the shaft 2 and serves to drive the other levers 87 and 88. By the machinery just described the shuttles are reciprocated twice at every revolution of the main shaft 2.

Each of the shuttles 75—and there is one to each weft-thread—comprises a casing rigidly secured to the block 76. The casing comprises a rim 101, Fig. 11, Sheet 11, and two side bars 102 and 103. The bar 102 is riveted to the rim 101, and the bar 103 is hinged at 104 thereto and secured by a bolt 105, engaging the curved ends of the bars. The bars 102 and 103 are apertured to accommodate a spindle 106, having rims 107 thereon. Bobbins on which the thread is wound are introduced into the casing and mounted on the spindles 106 after opening the hinged bar 103. The weft-thread passes out of the shuttle through a perforation in the top of the rim 101 and between two curved tension-tongues 108, located opposite each other.

After leaving the shuttles 75 the weft-threads pass up and over the pin-roller 9, as before described; but by the movement of the warp and weft set forth the weft is woven under two of the warp-threads and over two, progressing four threads in one direction and then four threads back. After each crossing of the weft and warp threads the cross thus formed is carried around by the pins 9ª on the rolls 9 and room made for the next. While a machine so constructed would weave a hammock, the weft thereof would be so coarse as to be of little value. To beat the meshes together, a novel mechanism is provided, which will be explained; but before doing so it is desirable to point out that the intervals between the warp-threads which are necessary in order to permit the shuttles 75 to be passed through are such that the mesh would be too coarse and loose. To cure this defect, the threads are converged, as before noted, after passing over the pin-roller and up to the feed-rollers 32 and 33.

The beating mechanism consists of a series of carrier-chains 109, located in the same plane and set parallel and intermediate to the converging warp-threads. The chains 109 consist of series of bar-links 110, each of which bears a downwardly-extending lug 111. These lugs are located to catch the crosses of the threads as they are brought over by the pin-roller. The forward ends of the chain 1 pass over sheaves 112, supported on a rail 113, which extends across the machine and is slidingly mounted in the frame. The rail 113 is connected to the spindles of the pin-roller by eye-bars 114, the movement of which is limited by collars 115, keyed on the said spindle. By this construction the rail 113 is compelled to move in unison with the pin-roller as it is reciprocated. To hold the rail 113 from all movement of rotation, it is fitted in apertured guide-blocks 116, mounted on the frame 1. The sheaves 112 are connected to the rail 113 in such a way as to automatically compensate for the transverse movement just mentioned of the forward ends of the chains. This is accomplished (see Fig. 10, Sheet 11) by setting each of the sheaves 112 parallel to the mean position of the corresponding chain and mounting them in bifurcated arms 117, which rest on a flange 113ª on the sheave-rail 113 and have recesses in their ends, within which are loosely fitted pins 118, rigidly mounted in the rail 113. Springs 119 surround the pins 118 and serve to return them to their initial position after displacement. A bolt 120, sliding in a slot 121 in the flange 113ª, limits the movement of the arms. The expansive force of the springs 119 is just equal to a normal pull on the chains. When the pull exceeds this amount, the springs will give and release the strain. It will easily be seen that this device compensates for the transverse movement of the chains in all ways but the change in alinement, which is rendered of no consequence by the rounded grooves in the sheaves. The converging chains 109 pass back and around a roller 122, (see Fig. 2, Sheet 3,) which tapers from both ends toward the center and has flanges 123 on the ends thereof. This roller 122 is journaled in the frame and provided with a pulley 124, keyed on one of its spindles, which pulley is connected when in operation by a belt to a pulley 125, loose on a shaft 52. (See Fig. 9, Sheet 11.) The pulley 125 is connected by a hub 52ª to a small gear 52ᵇ, which is but one of a train of gearing for increasing the motion of the shaft 48 before it is transmitted to the pulley 125. The other members of the train are a large gear 49, loose on the shaft 48, a small gear 50, carried by a gear 49, a large gear 51, loose on the shaft 52, a small gear 53, carried by the gear 51, and a large gear 54, keyed on the shaft 48. By this gearing the roller 122 is rapidly driven.

Located just below the roller 122, parallel therewith and several inches in front, is a bar 126, against which the chain rubs on coming back. This bar is set to regulate the rise of the chains and gradually disengage them from the fabric.

As before stated, the lugs 111 on the chains 109 will catch the crosses formed with the warp-threads by the diagonally extending weft-threads as they are brought over by the pin-roller 9 and carry them back. On leaving the bar 126 the chain will begin to rise and will become disengaged from the fabric and release it. It is obvious that by this contrivance the fabric can be woven as close or loose as desired by simply regulating the feed. From the feed-rollers the woven fabric passes down to the drum 63, as before described.

In weaving hammocks on my machine I have found that the number of completed hammocks turned out could be greatly increased by first weaving a piece long enough for a hammock, then leaving a length of about seven feet of straight unwoven threads, then weaving another portion, and so on. When the fabric is taken from the machine, the straight threads are centrally severed and twisted into ends. In order to adapt my machine to weave in this manner, a last device must be supplied, which consists of means for automatically feeding the fabric rapidly forward after completing a length sufficient for a hammock. This is accomplished by the following mechanism: A small pinion 127 is keyed on the outer end of the right spindle of the roller 33. (See Figs. 2, 5, and 6.) The gear 127 meshes with a large gear 128, mounted on a stud 129. A ratchet 130 is secured to the face of the gear 129 and is engaged by two pawls 131, carried by a plate 132, secured to the inner face of a small gear 133, mounted on the outer end of the stud 129 and held in place by a collar 133ª. To intermittently operate the gear 133, a sector 134, having a long radial arm 135, is provided. This sector-arm is pivoted at 136 and connected at its lower end to a fork 137, which straddles the power-shaft 48. The fork 137 carries a roller 138, located to contact with the projection of a single cam 139, provided with a hub 140, slidingly mounted on the shaft 48, but held from turning by a key 140ª. This hub has a circumferential groove 141, and a fork 142 embraces the hub 140 and carries two rollers 143, which engage the groove 141. A spring 142ª restores the fork to its initial position after displacement. The handle of the fork 142 is pivoted intermediate its ends to a standard 144 and is connected at its rear end to a link-bar 145, which bar is oppositely connected to the long arm of a bell-crank lever 146. The lever 146 is fulcrumed on the stud 72, and its short arm extends inwardly and carries a roller 147, located to contact with the projection 148 on a single cam 149. The cam 149 is set horizontally and is mounted on the upper face of a worm-gear 150, mounted on a bracket-arm 151. A worm 152 is set to mesh with the gear 150. The worm 152 is integral with a hub 153, mounted on a stud 154 and carrying a gear 155, in mesh with a gear 156 on the power-shaft 48. It is obvious that motion will be transmitted from the shaft 48 to the cam 149 through the medium of the worm-gearing, which cam intermittently actuates the lever 146, and thus throws the cam 139 out of and into position to engage the roller 138. This action operates the sector 134, which, acting on the gearing, revolves the feed-rollers and feeds the fabric rapidly ahead as far as desired, and thus leaves an unwoven portion between two woven lengths. The drum 63 will as soon as the fabric becomes slack be actuated by the friction-motor and wind it up.

The complete operation of my machine will now be briefly sketched. The machine is first strung with warp A and weft B, which threads are arranged alternately on the pin-roller 9 and extended back and secured to the drum 63. The forward ends of the warp pass through the tension-bar 6 and to the boxes 4, while the weft runs to bobbins inclosed in the shuttles 75. We will suppose the warp and weft threads all initially parallel. On starting the machine the pin-roller 9 and tension-bar 6 will be moved a distance of two threads of warp transversely the warp through the medium of the cam 14 and the racks 22 and 23. After this movement of the warp A the shuttles 75 will be driven through the warp by one set of the pusher-rods, which action will cross the warp and weft threads. This cross will be carried over by the rotation of the pin-roller 9 and brought within reach of the carrier-chains 109, which will run it back to the bar 126 and drop it intermediate the bar and the sag-roller 31. In the meantime the feed mechanism will be operated by the cam 47 and will turn the rollers 32 and 33 and feed the fabrics along. This slack will immediately be taken up by the drum 63, operated by the constantly-running friction-motor. After the above-stated movements have taken place the pin-roller 9 and tension-bar 6 will be again moved the same distance in the same direction as before, the shuttles driven back through the warp, making another cross, and the operations of the pin-roller, carrier-chains, feed mechanism, and drum repeated. The tension-bar 6 and pin-roller 9 will then be moved the same distance as before, but in the opposite direction, by the cam 14 and its connecting mechanism, the shuttles driven through the warp, and all of the other operations as to feed, &c., repeated, after which the tension-bar and pin-roller will be moved back to their initial position and the shuttles driven through the warp and the feed mechanism, &c., operated as before. After a length of mesh has been completed the projection 148 on the cam 147, which has been gradually traveling around, being driven by the worm-gears 150 and 152, will have reached a position engaging the roller on the bell-crank lever 146, which action will throw the cam 139 into engagement with the roller 138 and actuate the sector 134 to feed the warp and weft rapidly ahead, as before described, after which weaving will commence again.

I do not wish to be limited as to details of construction, as these may be modified in many particulars without departing from the spirit of my invention.

Having thus fully described my invention, what I claim, and wish to secure by Letters Patent, is—

1. In a machine of the class described, the combination with means for holding series of warp and weft threads and means for weaving said weft-threads diagonally said warp, of carrier-chains provided with lugs adapted to engage the crossed threads, sheaves bearing said carrier-chains at one end, a roller bearing said carrier-chains at the other end, and means for operating said roller, substantially as described.

2. In a machine of the class described, the combination with means for holding series of warp and weft threads and means for weaving said weft-threads diagonally said warp, of converging carrier-chains provided with lugs adapted to engage the crossed threads, sheaves supporting said chains, a roller beveled both ways toward the middle, and means for driving said roller, substantially as described.

3. In a machine of the class described, the combination with means for holding series of warp and weft threads and means for weaving said weft-threads diagonally said warp, of converging carrier-chains, yieldingly-mounted sheaves set at an angle and supporting said chains, a roller beveled each way toward the center and means for operating said roller.

4. In a machine of the class described, the combination with means for holding series of warp and weft threads and means for weaving said weft-threads diagonally said warp, of a rail mounted to slide longitudinally, sheaves mounted in said rail, a roller, carrier-chains having lugs thereon adapted to engage the mesh, said chains being mounted to run on said roller and said sheave, means for moving said rail longitudinally, and means for driving said chains, substantially as described.

5. In a machine of the class described, the combination with means for holding series of warp and weft threads and means for weaving said weft-threads diagonally said warp, of a pin-roller mounted to be moved longitudinally and to be revolved, a rail connected to said pin-roller and bearing a series of sheaves, means for moving said pin-roller longitudinally, a roller, carrier-chains bearing lugs and mounted on said sheaves and said roller, and means for driving said carrier-chains, substantially as described.

6. In a machine of the class described, the combination with means for holding series of warp and weft threads and means for weaving said weft-threads diagonally said warp, of carrier-chains bearing lugs constructed to engage the crossed threads and beat them back, and means for driving said chains, substantially as described.

7. In a machine of the class described, the combination with means for holding one end of a series of warp and weft threads of a pin-roller mounted to move longitudinally and to be revolved, means for moving said pin-roller longitudinally, and carrier-chains bearing lugs and mounted to be moved transversely in unison with said pin-roller, substantially as described.

8. In a machine of the class described, the combination, of a tension-board mounted to move longitudinally and bearing a rack, a pin-roller mounted to revolve and to move longitudinally, a rack connected to said pin-roller, gears meshing with said rack-bars, a cam mounted to be driven, a fork operated by said cam and bearing a rack meshing with said gears, substantially as described.

9. In a machine of the class described, the combination with a tension-board and a pin-roller both mounted to move longitudinally and provided with racks, gears meshing with said racks, a rack-bar meshing with said gears, a cam mounted on a shaft and constructed to actuate said tension-bar and pin-roller intermittently, substantially as described.

10. In a loom the combination, with feed-rollers, a gear connected to drive said rollers, a sector meshing with said gear, a cam slidingly mounted on a shaft, a fork bearing a roller and connected to said sector, said roller being located to be engaged by said cam, means for driving said shaft, and means for sliding said cam on said shaft, substantially as described.

11. In a loom of the class described, the combination of means for yieldingly holding series of warp and weft threads, means for weaving each of said weft-threads diagonally said warp-threads forming crosses, means for feeding said warp and weft ahead, and means for engaging said crosses to beat them back to close up the mesh, substantially as described.

12. In a device of the class described, the combination with a pair of feed-rollers connected to revolve in unison, a gear carrying a ratchet and connected to operate said feed-rollers, a gear bearing a plate carrying a pawl engaging said ratchet, a sector meshing with said plate-bearing gear, and means for intermittently operating said sector, substantially as described.

13. In a loom, the combination, with feed-rollers connected to turn in unison, a sector, means engaged by said sector to operate said rollers, a fork connected to said sector, a cam located to operate said fork, and means for driving said cam, substantially as described.

14. In a loom of the class described, the combination with a worm and means for driving it, of a worm-gear meshing with said worm and carrying a single cam, a bell-crank lever mounted to be engaged by said cam, a shaft having a grooved hub slidingly mounted thereon and bearing a cam, a fork engaging said grooved hub, a link-bar connecting said fork and said bell-crank lever, feed-rolls and means operated by said sliding cam to actuate the feed-rolls, substantially as described.

15. In a loom of the class described, the combination with a worm and means for driving it, of a worm-gear meshing with said worm and carrying a single cam, a bell-crank lever located to be engaged by said cam, a grooved hub bearing a cam slidingly mounted, means for connecting said bell-crank lever and said grooved hub to slide said hub back and forth, feed-rolls, and means operated by said cam on said sliding hub to actuate the feed-rolls, substantially as described.

16. In a loom, the combination with feed-rollers connected to be driven in unison, of a gear connected to operate said rollers, a sector meshing with said gear, a fork bearing a roller and connected to said sector, a shaft bearing a cam slidingly mounted thereon, means for intermittently operating said cam to slide it on said shaft, and means for driving said shaft, substantially as described.

17. In a loom of the class described, the combination of means for yieldingly holding series of warp and weft threads, means for weaving each of said weft-threads diagonally said warp-threads forming crosses, and means for engaging said crosses to beat them back to close up the mesh, substantially as described.

18. A shuttle comprising the combination of an apertured block, a rim secured to said block, a tension mounted on said rim, side bars secured to said rim, and a spindle journaled in apertures in said side bars, said spindle being constructed to support a bobbin, substantially as described.

19. A shuttle comprising the combination of an apertured block, a rim secured to said block, a first side bar secured to said rim, a second side bar hinged to said first side bar, and a spindle journaled in said side bars, substantially as described.

In testimony whereof I have hereunto set my hand in presence of two subscribing witnesses.

ZEBULON L. CHADBOURNE.

Witnesses:
FRANK G. RADELFINGER,
LULU F. SMITH.